F. J. BOWERS.
TAPE ATTACHMENT.
APPLICATION FILED AUG. 15, 1910.

1,006,056.

Patented Oct. 17, 1911.

WITNESSES:
N. Abramson
A. McCarthy

INVENTOR
Frank J. Bowers
By Geo. W. Ives, Attorney

UNITED STATES PATENT OFFICE.

FRANK J. BOWERS, OF CLEVELAND, OHIO.

TAPE ATTACHMENT.

1,006,056. Specification of Letters Patent. Patented Oct. 17, 1911.

Application filed August 15, 1910. Serial No. 577,342.

*To all whom it may concern:*

Be it known that I, FRANK J. BOWERS, a citizen of the United States, and a resident of Cleveland, in the county of Cuyahoga and State of Ohio, have invented certain new and useful Improvements in Tape Attachments, of which the following is a specification, reference being had to the accompanying drawings.

This invention relates to improvements in tape attachments.

The primary object of my invention is to provide a holder arranged to be detachably secured to the terminal loop of a measuring tape, so that the end of the tape can be readily held to the end of a board, while measuring the same.

A further object is to provide the end of a tape with an attachment which may be forced into the ground, to hold the end of the tape during the measuring operation.

Another object is to provide a light, neat, simply constructed device arranged to be detachably secured to the end of a measuring tape, so that the end of the tape may be conveniently held to the article or object being measured.

With these and other objects in view, the present invention consists in the combination and arrangement of parts as will be hereinafter more fully described and particularly pointed out in the appended claim, it being understood that changes in the specific structure shown and described may be made within the scope of the claim, without departing from the spirit of the invention.

Figure 1:
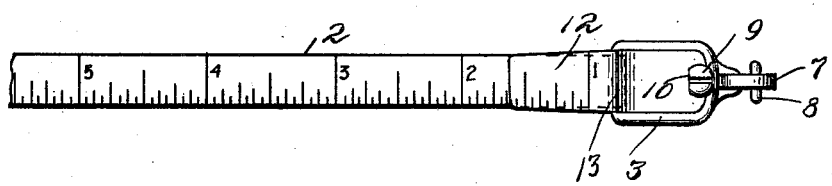
Figure 2:
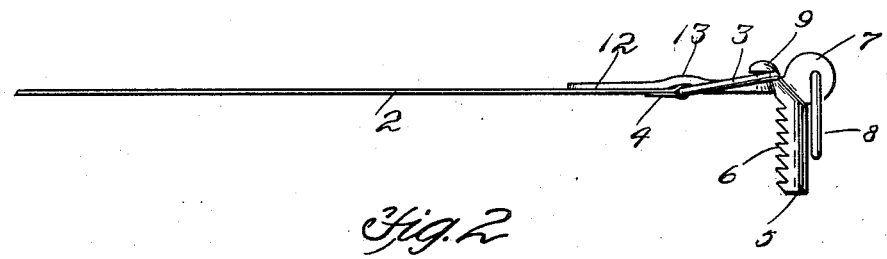
Figure 3:
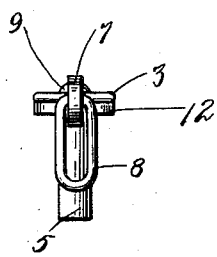
Figure 4:
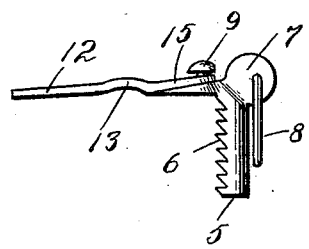
Figure 5:
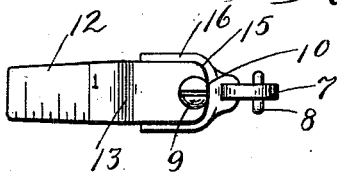

In the drawings forming a part of this specification, and in which like numerals of reference indicate similar parts in the several views: Figure 1, shows an end of a measuring tape provided with my attachment, disclosing the same in top view. Fig. 2, is an elevational view. Fig. 3, is a rear end view. Fig. 4, is a side elevational view of the attachment as disconnected. Fig. 5, shows a top view of the attachment.

In the employment of a measuring tape, especially where but one person is using the same, it is necessary to secure the starting end of the tape. In determining the exact linear measurement of boards and the like, where but one person takes the measurements, some instrument is usually employed by means of which the end of the tape is temporarily secured. In my present invention I provide a measuring tape with an attachment, by means of which the end of the tape may be held to the board or be forced into the ground while the measurement is being taken.

In the accompanying drawings, the numeral, 2, represents the end of an ordinary measuring tape provided with the usual terminal link, 3, this link, 3, being loosely connected to the tape, which has its ends recurved, as is shown at 4, in Fig. 2. These tapes are so graduated that the measurement begins with the inner end of the link, 3. In order to provide such a tape with a convenient holder, I employ an approximately semi-circular head, 15, from which extends the flat, rectangular tongue, 12, this tongue being slightly curved, as shown at 13, and offset and held slightly at an angle to the bottom of the head, 15.

Extending from the end of the head, 15, immediately opposite the outer end of the tongue, 12, as shown in Fig. 4, is the cylindrical post, 5, provided with the serrations, 6, forming teeth upon the side extending toward the outer end of the tongue, 12. Extending from the upper end of this post, 5, is the apertured ear, 7, which carries the holding link, 8, as clearly shown in the drawings. The tongue, 12, in conjunction with the head, 15, forms a shoulder, as is shown at, 16, in Fig. 5, and it is upon this shoulder and against the head, 15, that the tape link, 3, rests in the manner shown in the drawings.

The head, 15, is provided with a screw threaded aperture to receive the screw, 9, the head of which laps and extends over the shoulder, 16, so that when the tape link, 8, is in position, by means of the screw, 9, the link, 3, is firmly held to the head.

As shown in Fig. 2, the tongue, 12, extends through the link, 3, so that the tape will rest against the under surface of this tongue, 12.

In Fig. 2, I show the attachment and tape in working condition. The tongue, 12, is slightly bowed, as shown at, 13, so as to accommodate the end of the tape, 4.

The attachment is firmly held to the pivotally held link, 3. As shown in Fig. 1, the head of the screw, 9, is flattened upon one side, as is shown at 10, so that when this flattened portion of the screw is turned toward the link, 3, the link can be readily removed.

A tape attachment constructed according to my invention is noticeable because of its extreme simplicity. The device is further inexpensive in construction and both durable and efficient in operation, and the adjustment of the attachment to the tape may be made with ease, accuracy and despatch.

The end of a tape provided with one of my attachments can be hooked over the end of a board or other object to securely hold the tape while taking the measurement.

It is, of course, understood that where the tape graduations begin at the end of the tape proper, the post, 5, is carried forward and is in position immediately at the end of the tape. As the graduation upon most tapes begin with the inner end of the link, 3, I have shown my attachment as connected with such a tape.

As shown in Fig. 3, the link, 8, is long and narrow, and but little larger than the member, 5, so that if necessary this link can also be placed within an opening arranged to hold the stem, 5. Where very thin boards are being measured a nail or sliver can be carried through this link, 8, where the same is held within an opening.

Having thus described my said invention what I claim as new and desire to secure by United States Letters Patent, is:

The combination with the terminal link, of a measuring tape, of a plate having a shoulder, said link resting upon said shoulder, a screw carried by said plate to hold said link to said shoulder, said plate having a serrated post, and a link secured to said post.

In testimony whereof, I affix my signature, in presence of two witnesses.

FRANK J. BOWERS.

Witnesses:
 GEORGE T. FOX,
 BIRDIE M. JONES.

---

Copies of this patent may be obtained for five cents each, by addressing the "Commissioner of Patents, Washington, D. C."